No. 607,661. Patented July 19, 1898.
R. PIOTROWSKI.
BEER BARREL.
(Application filed Sept. 20, 1897.)
(No Model.)
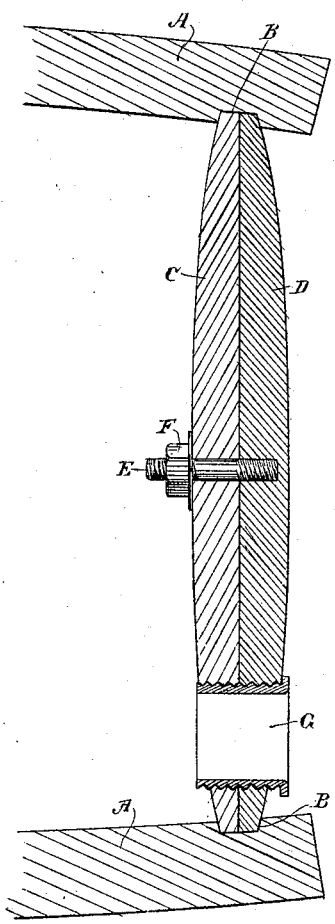
Witnesses,
Inventor
Rudolf Piotrowski
By Dewey & Co.

UNITED STATES PATENT OFFICE.

RUDOLF PIOTROWSKI, OF SAN FRANCISCO, CALIFORNIA.

BEER-BARREL.

SPECIFICATION forming part of Letters Patent No. 607,661, dated July 19, 1898.

Application filed September 20, 1897. Serial No. 652,276. (No model.)

*To all whom it may concern:*

Be it known that I, RUDOLF PIOTROWSKI, a citizen of the United States, residing in the city and county of San Francisco, State of California, have invented an Improvement in Beer-Barrels; and I hereby declare the following to be a full, clear, and exact description of the same.

My invention relates to certain improvements in barrels and kegs such as are employed to contain beer and other effervescent liquids under considerable pressure.

It consists, essentially, in the combination of iron or steel and wood to form a composite head having great resisting strength without an injurious metallic contact with the contents of the keg, and also in details of construction, which will be more fully explained by reference to the accompanying drawing, in which the figure is a sectional view showing the construction of my barrel-head and its attachment.

For the purposes of holding and transporting what is known as "steam-beer" under a considerable pressure of gas it is necessary to make the holding-kegs of great strength and thickness. Whenever these kegs or barrels are made of larger sizes, the heads are frequently blown out and destroyed by the internal pressure. Any attempt to make such heads entirely of metal results in an injury to the delicate flavor of the beer.

In my invention I have formed a composite head for the keg or barrel, the inner portion of which is made of wood, so that only the wood will come in contact with the beer, and the outer portion is made of iron, steel, or other sufficiently strong metal to resist the interior pressure.

A A are the staves forming the sides of the barrel, which are suitably hooped and bound together. Near the ends these staves have formed in them the groove or channel B, which is adapted to receive the peripheral edges of the heads. This groove may be made of any suitable or desired form. I have here shown it as having a depth of about one-quarter of an inch, a diameter at the bottom of about one-half an inch, and any desired degree of flare or taper. The head is composed of a wooden disk C and a metallic disk D, the two being made of essentially the same diameter and adapted to fit closely together, so that their peripheral edges coincide and will fit into the groove B, by which they are held in place within the staves of the barrel. I prefer to make the disks C and D thinner at the periphery, increasing gradually in thickness to the center. Through the center or at other suitable point of the wooden interior disk I make a hole adapted to receive a bolt E. The inner end of this bolt is screw-threaded and enters a corresponding screw-threaded hole in the iron head D, said hole being coincident with the hole through the wood.

By means of a nut F screwing upon the outer end of the bolt E the wood and iron head is drawn strongly together, and in order to insure a more perfect connection it may, if desired, be so made that the screwing up of the nut will produce a draft at the center, which will force the edges firmly together. The head thus constructed is inserted in the usual manner and will have a resisting power sufficient to prevent the head being broken by any interior pressure which is ever brought to bear upon it. The wooden interior of the head being the only part in contact with the beer, the latter is not in any way injured in flavor thereby.

In order to properly provide for the introduction of the faucet for drawing off the beer, I have shown a bushing G, screw-threaded upon the outside and adapted to fit a correspondingly screw-threaded opening made coincidently in both the iron and the wooden portions of the head. If this bushing is intended to receive the ordinary faucet, the interior may be left smooth or have an annular wooden or other lining into which the faucet may be driven in the usual manner, or the bushing may be arranged to receive any of the various forms of tap and faucet which it may be desired to employ.

Having thus described my invention, what I claim as new, and desire to secure by Letters Patent, is—

1. In combination with a barrel composed of wooden staves having grooves or channels near the ends, the heads consisting of coincident wooden and metal disks having their outer edges fitting said grooves or channels, an opening made entirely through the wooden disk and an opening made in the inner face of the metal disk and extending only partway through the same, a short bolt threaded at both ends, with one of the ends fitted in the opening in the metal disk, a nut upon the other threaded end of said bolt for drawing the disks together and a bushing fitted to an opening made through both disks and adapted to receive the draw-off faucet.

2. In a barrel the heads thereof each consisting of coincident disks fitted face to face and with their outer edges fitted in the grooves or channels of the staves, one of said disks of wood and the other of metal and both disks made thicker at their centers than at their outer edges, a bolt projecting from the inner face only of the metal disk and passing through a hole in the companion disk and slightly beyond the same, and a nut on said projecting end for drawing the central portions of the disk together.

In witness whereof I have hereunto set my hand.

RUDOLF PIOTROWSKI.

Witnesses:
S. H. NOURSE,
JESSIE C. BRODIE.